US008639672B2

(12) United States Patent
Amit et al.

(10) Patent No.: US 8,639,672 B2
(45) Date of Patent: *Jan. 28, 2014

(54) MULTIPLEX CLASSIFICATION FOR TABULAR DATA COMPRESSION

(75) Inventors: Jonathan Amit, Yehud (IL); Lilia Demidov, Yehud (IL); Nir Halowani, Yehud (IL); Sergey Marenkov, Yehud (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,996

(22) Filed: Mar. 27, 2012

(65) Prior Publication Data

US 2013/0262407 A1    Oct. 3, 2013

(51) Int. Cl.
*G06F 7/00* (2006.01)
*G06F 17/00* (2006.01)

(52) U.S. Cl.
USPC ............................. 707/693; 382/232; 382/239

(58) Field of Classification Search
USPC .......................................................... 707/693
See application file for complete search history.

(56) References Cited

U.S. PATENT DOCUMENTS

| 5,546,575 | A | 8/1996 | Potter et al. |
| 7,558,290 | B1* | 7/2009 | Nucci et al. .................... 370/477 |
| 7,783,781 | B1 | 8/2010 | Rothstein et al. |
| 2006/0126494 | A1 | 6/2006 | Dougall et al. |
| 2008/0071818 | A1* | 3/2008 | Apanowicz et al. .......... 707/101 |
| 2009/0006399 | A1* | 1/2009 | Raman et al. ...................... 707/7 |
| 2009/0079597 | A1* | 3/2009 | McCanne et al. ............... 341/51 |
| 2009/0089507 | A1* | 4/2009 | Chen et al. ..................... 711/125 |
| 2009/0174583 | A1* | 7/2009 | Diaz-Gutierrez et al. ...... 341/65 |
| 2009/0193042 | A1 | 7/2009 | Hornibrook et al. |
| 2009/0240718 | A1 | 9/2009 | Rao et al. |
| 2010/0082417 | A1 | 4/2010 | Wu |
| 2010/0278446 | A1* | 11/2010 | Ganesh et al. ................. 382/243 |
| 2010/0281079 | A1* | 11/2010 | Marwah et al. ............... 707/812 |
| 2011/0055174 | A1* | 3/2011 | Popovski et al. ............. 707/693 |
| 2011/0153623 | A1* | 6/2011 | Vo ................................. 707/752 |
| 2011/0188322 | A1* | 8/2011 | Chou ........................ 365/189.05 |
| 2012/0054225 | A1* | 3/2012 | Marwah et al. ............... 707/769 |

FOREIGN PATENT DOCUMENTS

| CN | 101835043 A | 9/2010 |
| CN | 102226906 A | 10/2011 |
| EP | 2317654 A1 | 5/2011 |
| JP | 2008129678 A | 6/2008 |
| JP | 2010026884 A | 2/2010 |
| WO | WO2006014978 A2 | 2/2006 |

OTHER PUBLICATIONS

Liefke et al. authoring "Xmill: an Efficient Compressor for XML Data", ACM, published 2000, pp. 153-164. Download: http://dl.acm.org/citation.cfm?id=342009.335405.*

(Continued)

*Primary Examiner* — Hares Jami
(74) *Attorney, Agent, or Firm* — Griffiths & Seaton PLLC

(57) ABSTRACT

For multiplexer classification for column compression of tabular data, similar type data segments are classified into classes for grouping the data segments into compression streams associated with each one of the classes. The compression streams are encoded based on a class-specific optimized encoding operation. The compression streams into one output buffer, wherein the compression streams are extracted.

14 Claims, 8 Drawing Sheets

(56) References Cited

OTHER PUBLICATIONS

P. Deutsch et al., "ZLIB Compressed Data Format Specification version 3.3 (RFC1950)", 1996, L. Peter Deutsch and Jean-Loup Gailly, IP.com No. IPCOM000004248D.

DB2 for Linux, UNIX, and Windows Database Administration Concepts and Configuration Reference (SC27-2442-02), Version 9 Release 7, IBM Corporation, Sep. 2010, pp. 219-245, http://publibfp.dhe.ibm.com/epubs/pdf/c2724422.pdf.

Exadata Hybrid Columnar Compression, An Oracle White Paper, Dec. 2009.

* cited by examiner

MULTIPLEX CLASSIFICATION FOR TABULAR DATA COMPRESSION

BACKGROUND OF THE INVENTION

1. Field of the Invention

The present invention relates in general to computers, and more particularly to multiplex classification for tabular data compression in a computing environment.

2. Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components.

Computing systems are used to store and manage a variety of types of data, such as Tabular data. Tabular data is typically organized into rows and columns to form common tables, e.g., as used in relational tables, word processing documents, spreadsheets or spreadsheet-like structures, or similar database structures. The formation of these tables includes a variety of organized arrays and arrangements for the rows and columns. However, the actual physical storage of the tabular data may take a variety of forms. For example, although the logical structure of the tabular data may be multidimensional, the tabular data may physically be stored in linear format, such as in row-major or column major format. In row-major format, column values of a row from the table-like structure are stored contiguously in persistent storage. By contrast, in column-major format, for a given column of multiple rows, column values of the column are stored contiguously.

Data compression is widely used to reduce the amount of data required to process, transmit, or store a given quantity of information. Data compression is the coding of data to minimize its representation. Compression can be used, for example, to reduce the storage requirements for files, to increase the communication rate over a channel, or to reduce redundancy prior to encryption for greater security. Tabular data structures would also benefit from data compression since data compression is useful to reduce the consumption of expensive resources, such as hard disk space or transmission bandwidth.

SUMMARY OF THE DESCRIBED EMBODIMENTS

Since data storage is expensive, it is clearly desirable to minimize the amount of storage required to store structured data. Additionally, when a data sequence is copied or transferred between storage locations, it is desirable to minimize the overhead in terms of CPU cycles, network usage, etc. within the database field, much research has been carried out in to techniques for maintaining copies of data. In tabular data, compressing each column independently would provide for a higher compression ratio rather than compressing the entire table with one stream. The reason for the increased compression ratio is that the data in each column is relatively homogeneous. However, storage controllers are unaware of the tabular structure since they cannot apply column compression algorithm(s) and cannot benefit from the increased compression ratio. As a result, efficiency and productivity may be reduced.

Accordingly, and in view of the foregoing, various exemplary system and computer program product embodiments for multiplexer classification for column compression of tabular data are provided. In one embodiment, by way of example only, similar type data segments are classified into classes for grouping the data segments into compression streams associated with each one of the classes. The compression streams are encoded based on a class-specific optimized encoding operation. The compression streams into one output buffer, wherein the compression streams are extracted.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, due to the expenses and resources required for data storage, it is desirable to minimize the amount of storage required to store structured data. Additionally, when a data sequence is copied or transferred between storage locations, it is desirable to minimize the overhead in terms of CPU cycles, network usage, etc. within the database field. In tabular data, compressing each column independently would provide for a higher compression ratio rather than compressing the entire table with one stream. The reason for the increased compression ratio is that the data in each column is relatively homogeneous. However, storage controllers are unaware of the tabular structure since they cannot apply column compression algorithm(s) and cannot benefit from the increased compression ratio. As a result, efficiency and productivity may be reduced.

In contrast, and to address the inefficiencies and performance issues previously described, the illustrated embodiments provide mechanisms for enabling multiplex classification for tabular data compression resulting in higher compression ratio of storage array by choosing a unique streamer for each column processing. In one embodiment, the mechanisms provide a new block array output buffer container format which supports multi-purpose blocks with several internal block prototypes, including: column compression with unique streamer, regular compression, raw block, and column compression with one streamer.

In one embodiment, by way of example only, the mechanisms of the present invention classify similar type data segments into classes for grouping the data segments into compression streams associated with each one of the classes. The compression streams are encoded based on a class-specific optimized encoding operation. The compression streams combined into one output buffer and the compression streams are extracted.

Figure 1:
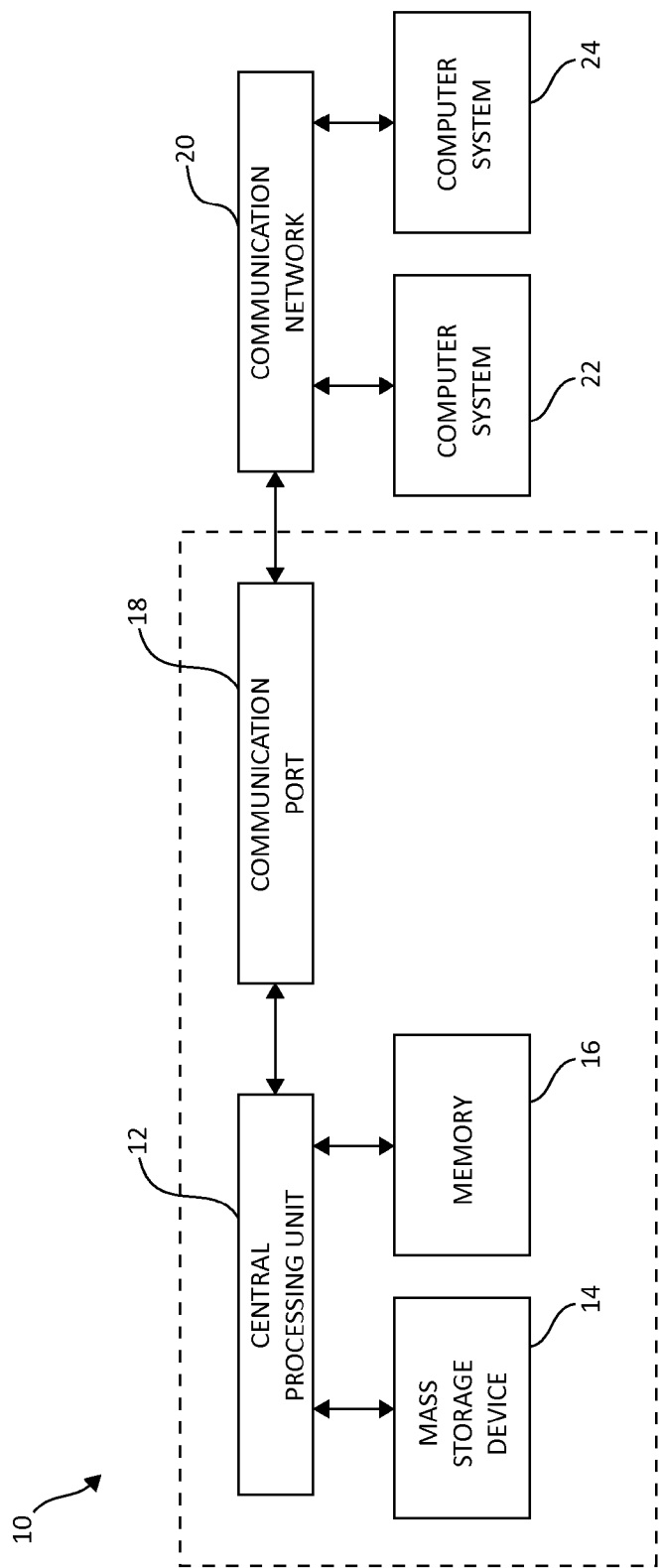
FIG. 1 illustrates a computer storage environment having an example storage device in which aspects of the present invention may be realized.

Turning now to FIG. 1, exemplary architecture 10 of data storage systems (e.g., virtual tape systems) in a computing environment is depicted. The computer system 10 includes central processing unit (CPU) 12, which is connected to mass storage device(s) 14 and memory device 16. Mass storage devices can include hard disk drive (HDD) devices, solid-state devices (SSD) etc, which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
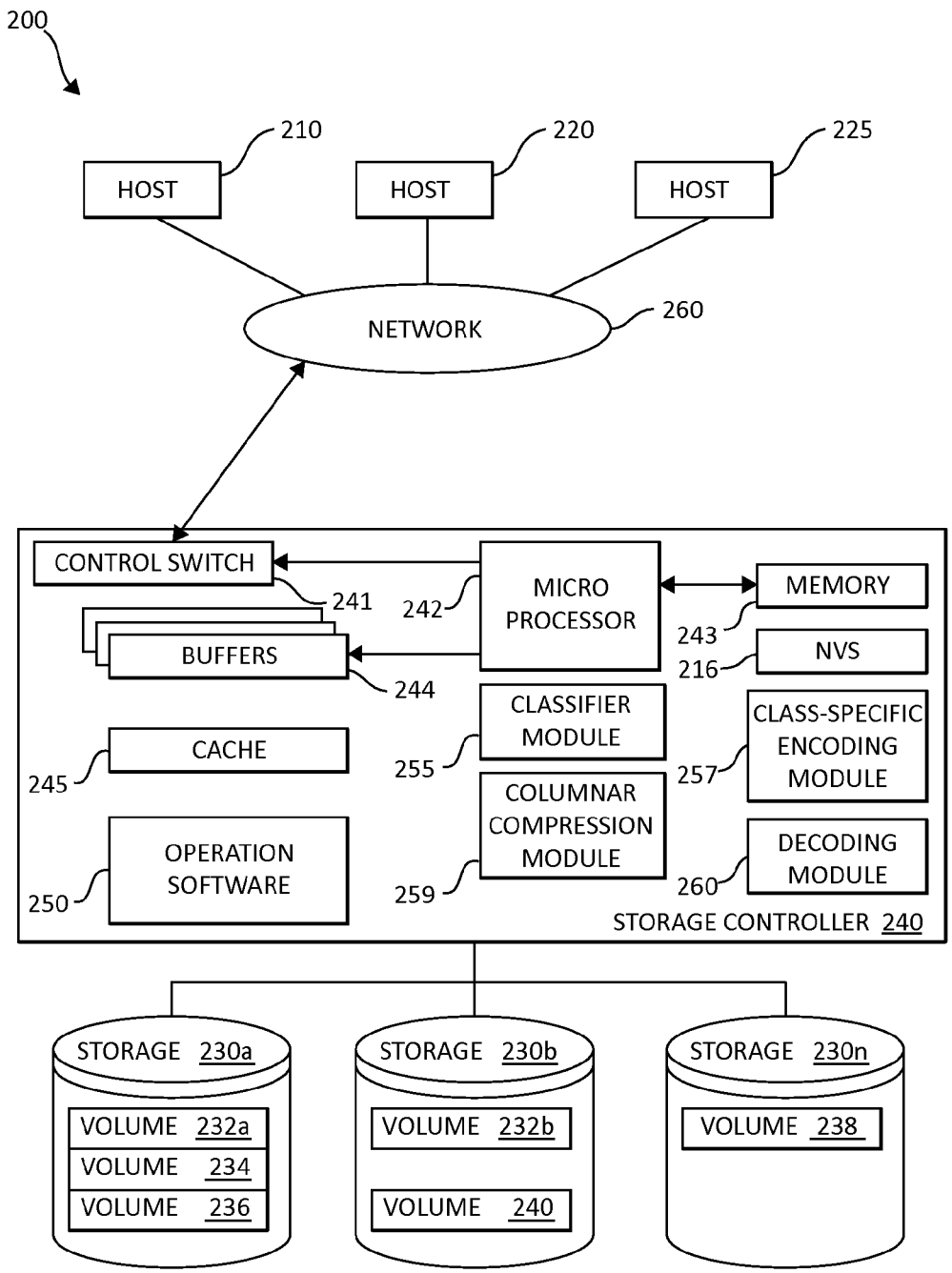
FIG. 2 illustrates an exemplary block diagram showing a hardware structure of a data storage system in a computer system in which aspects of the present invention may be realized.

FIG. 2 is an exemplary block diagram 200 showing a hardware structure of a data storage system in a computer system according to the present invention. Referring to FIG. 2, there are shown host computers 210, 220, 225, each acting as a central processing unit for performing data processing a part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 1 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps associated with managing storage 230 and executing the steps and methods of the present invention for multiplexer column compression of tabular data in a computing environment. In one embodiment, system memory 243 includes, is associated, or is in communication with the operation software 250 for multiplexer column compression of tabular data in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the Cache 245 for any purposes suited to accomplish the objectives of the present invention. In some embodiments, a backup power source (not shown in FIG. 2), such a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a classifier module 255, a class-specific encoding module 257, a columnar compression module 259, and a decoding module 260 to assist with multiplexer column compression of tabular data in a computing environment. The classifier module 255, class-specific encoding module 257, columnar compression module 259, and decoding module 260 may work in conjunction with each and every component of the storage controller 240, the hosts 210, 220, 225, and storage devices 230. Both the classifier module 255, class-specific encoding module 257, columnar compression module 259, and decoding module 260 may be structurally one complete module working together and in conjunction for multiplexer column compression of tabular data in a computing environment or may be individual modules. The classifier module 255, class-specific encoding module 257, columnar compression module 259, and decoding module 260 may also be located in the cache 245 or other components of the storage controller 240 to accomplish the purposes of the present invention.

The storage controller 240 may be constructed with a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, the classifier module 255, class-specific encoding module 257, columnar compression module 259, and decoding module 260 on which information may be set. Multiple buffers 244 may be implemented with the present invention to assist with the multiplexer column compression of tabular data in a computer storage environment.

In one embodiment, by way of example only, the host computers or one or more physical or virtual devices, 210, 220, 225 and the storage controller 240 are connected through a network adaptor (this could be a fiber channel) 260 as an interface i.e., via a switch called "Fabric." In one embodiment, by way of example only, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, the classifier module 255, class-specific encoding module 257, columnar compression module 259, and decoding module 260 are in communication with each other and may be separate or one individual component(s). Also, several, if not all of the components, such as the operation software 245 may be included with the memory 243 for multiplexer column compression of tabular data in a computer storage environment. Each of the components within the storage device may be linked together and may be in communication with each other for purposes suited to the present invention.

As will be described below, in one embodiment the mechanisms of the illustrated embodiments seek to provide the ability for real-time compression of tabular data. In one embodiment, the mechanisms detect the tabular structure of the data in a storage controller. The mechanisms detect the tabular structure by using a combination of column compression to enable higher compression ratio on the storage controller. The mechanism use compression feedback, common delimiters and/or common cell padding patterns, and/or a combination of common delimiters and/or common cell padding patterns for the detection of the incoming tabular data structure.

Figure 3:
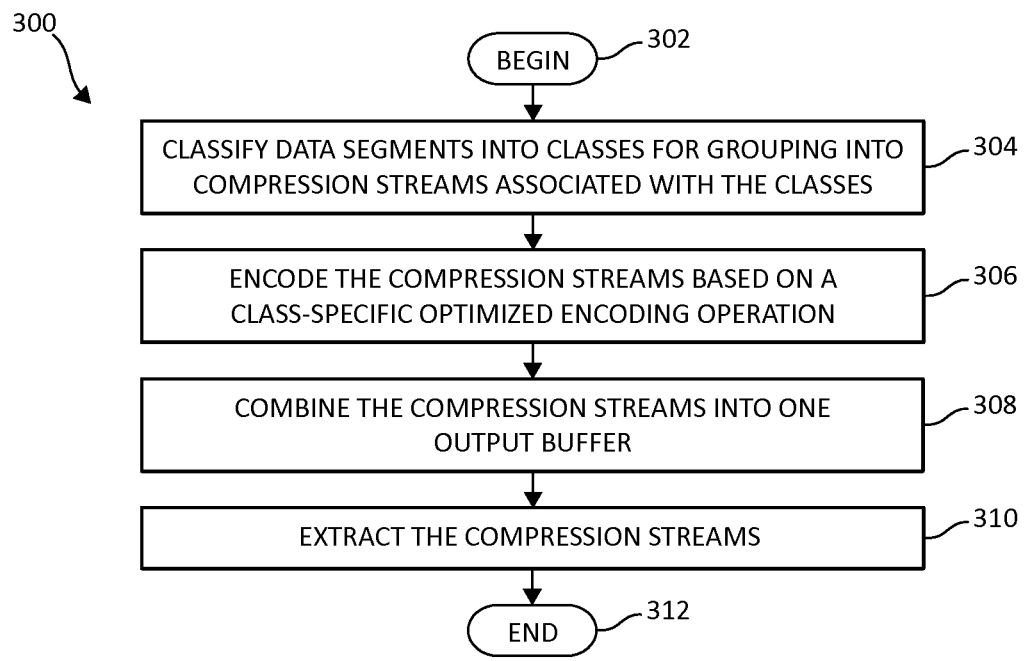
FIG. 3 is a flowchart illustrating an exemplary method for multiplex classification for tabular data compression.

FIG. 3 is a flowchart illustrating an exemplary method 300 for multiplex classification for tabular data compression. The method 300 begins (step 302) by classifying similar type data segments into classes for grouping the data segments into compression streams associated with each one of the classes (step 304). The compression streams are encoded based on a class-specific optimized encoding operation (step 306). The compression streams are combined into one output buffer (step 308). The compression streams are extracted (step 310). The method 300 ends (step 312).

Figure 4:
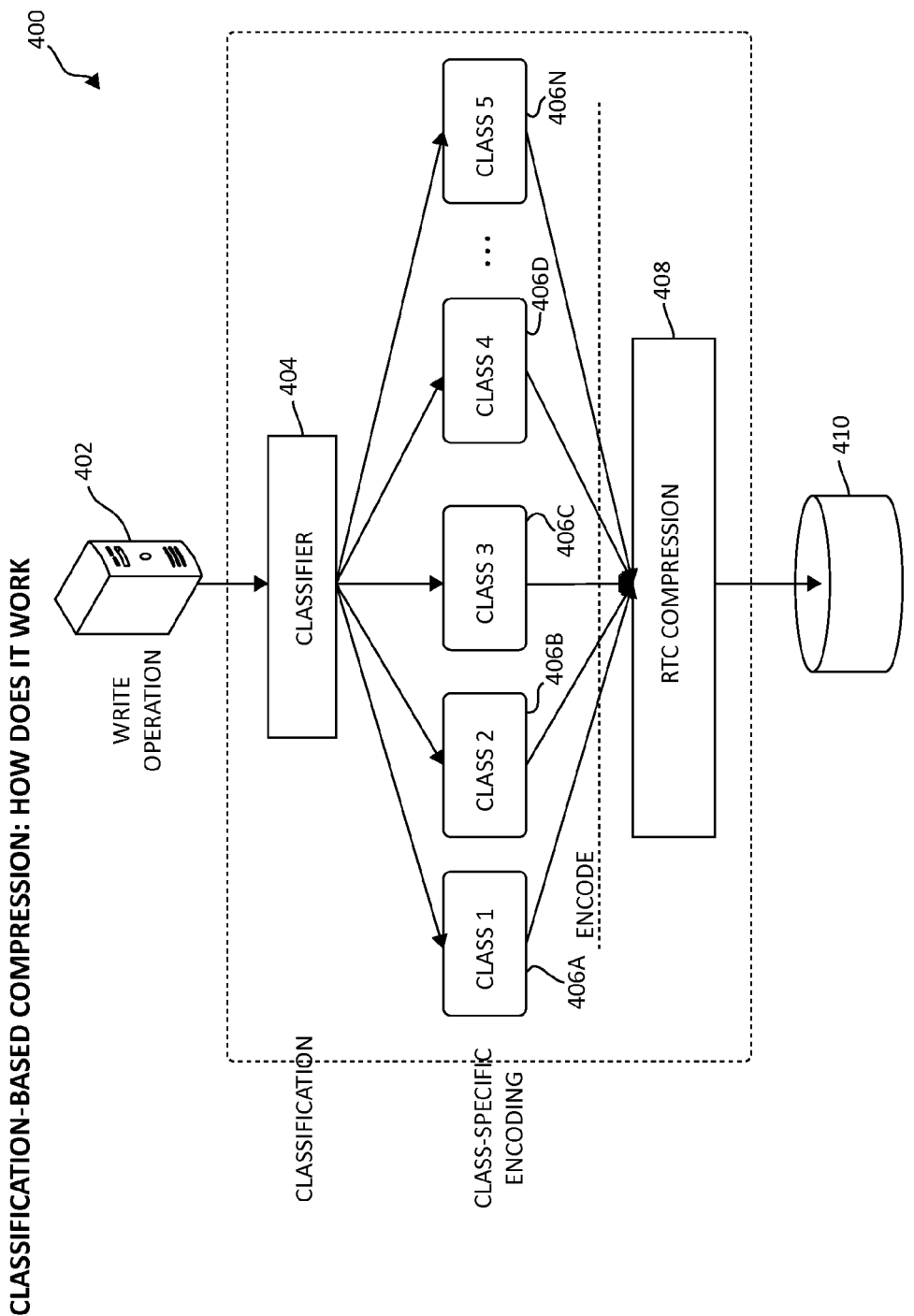
FIG. 4 illustrates an exemplary block diagram showing multiplex classification base compression.

FIG. 4 illustrates an exemplary block diagram 400 showing multiplex classification base compression. As illustrated in FIG. 4, incoming data 402 (e.g., a I/O operation such as a write operation) is sent to a classifier 404. The classifier 404 groups together data of similar type in the same compression stream by classifying the data. As illustrated in FIG. 4, the classifications 406 may be classified and sorted according to whether the data is text 406A, numbers 406B, 406C, binary 406D, and/or additional classes 406N, and then sorted into these classes 406 accordingly. The multiplexer classification for column compression operations enable the grouping together of data of similar type in the same compression stream and also classifies the data in a manner which retains a smaller alphabet footprint. Each classification retains a significantly larger compression window, which allow identification of repetitions that are further apart. (e.g., by using a dictionary). The classifying may be performed in a single pass and is not limited to a rigid format. The classification-based compression supports both fixed and variable data lengths (e.g., JASON, XML, etc.) and compresses data across the columns. Since standard compression operations do not compress short tokens efficiently, the classification uses small dictionaries to assist with short token compression. For each class 406, the mechanisms apply a class-specific optimized encoding operation and then combine all compressed class-specific encoding methods into one output buffer for real-time compression 408. Packing together all classes into one output buffer is also required in order to provide random access read operations from storage. It should be noted that a variety of columnar compression operations may be applied to each of the compression streams for generating an increased compression ratio. The data may then be extracted and stored in a varied of storage components 410.

Figure 5:
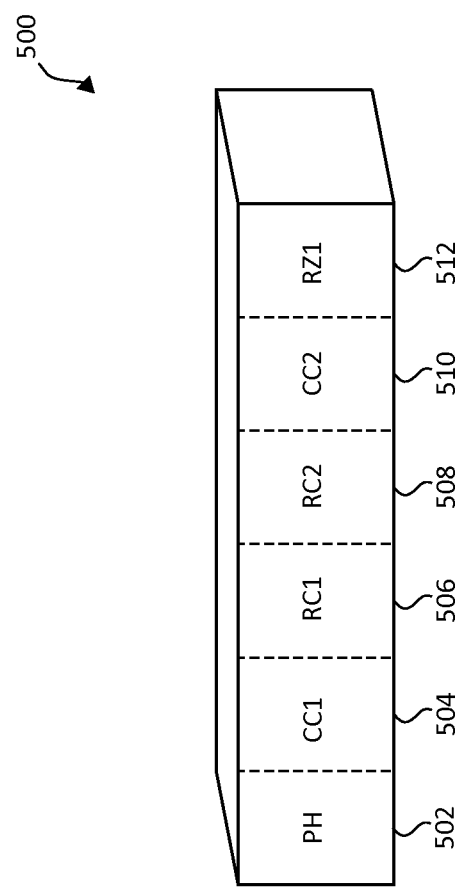
FIG. 5 illustrates an exemplary block diagram showing a multiplex output buffer in which aspects of the present invention may be realized.

FIG. 5 illustrates an exemplary block diagram showing a multiplex output buffer in which aspects of the present invention may be realized. In one embodiment, a multiplex output buffer output buffer may contain 3 types of encoded streams. 1) column compression compressed buffer—used for a specific column (e.g., column compression|streamer number used and may have a unique column compression streamer). 2) column compression regular compression—which may contain a concatenated column string compressed with one compression streamer (e.g., one ZLIB compression streamer) for all the column stings (e.g., regular column compression with one compression streamer). 3) A regular compressed buffer—which is used when no column compression method is used. Column compression stream may, in one embodiment, be intended to refer to a column compression stream that is a unique column compression streamer for a specific column. Column compression regular compression stream (e.g., "regular column compression") may, in one embodiment, be intended to refer to regular column compression with a concatenated column string compressed with one compression streamer (for example, a regular column compression with one streamer). Regular compressed stream may, in one embodiment, be intended to refer to a regular compressed buffer/stream used when no column compression method/technique is used (for example a regular ZLIB compressed buffer).

As illustrated in FIG. 5, Padding Header 502 ("PH), Column Compression with streamer 1 504 ("CC1), Regular Column Compression 506 ("RC1), Regular Column Compression 508 (Same streamer as in RC1) (RC2), Column Compression with streamer 2 labeled as 510 ("CC2), and a Regular Compressed Buffer 512 (RZ1) is depicted in the output buffer.

Figure 6:
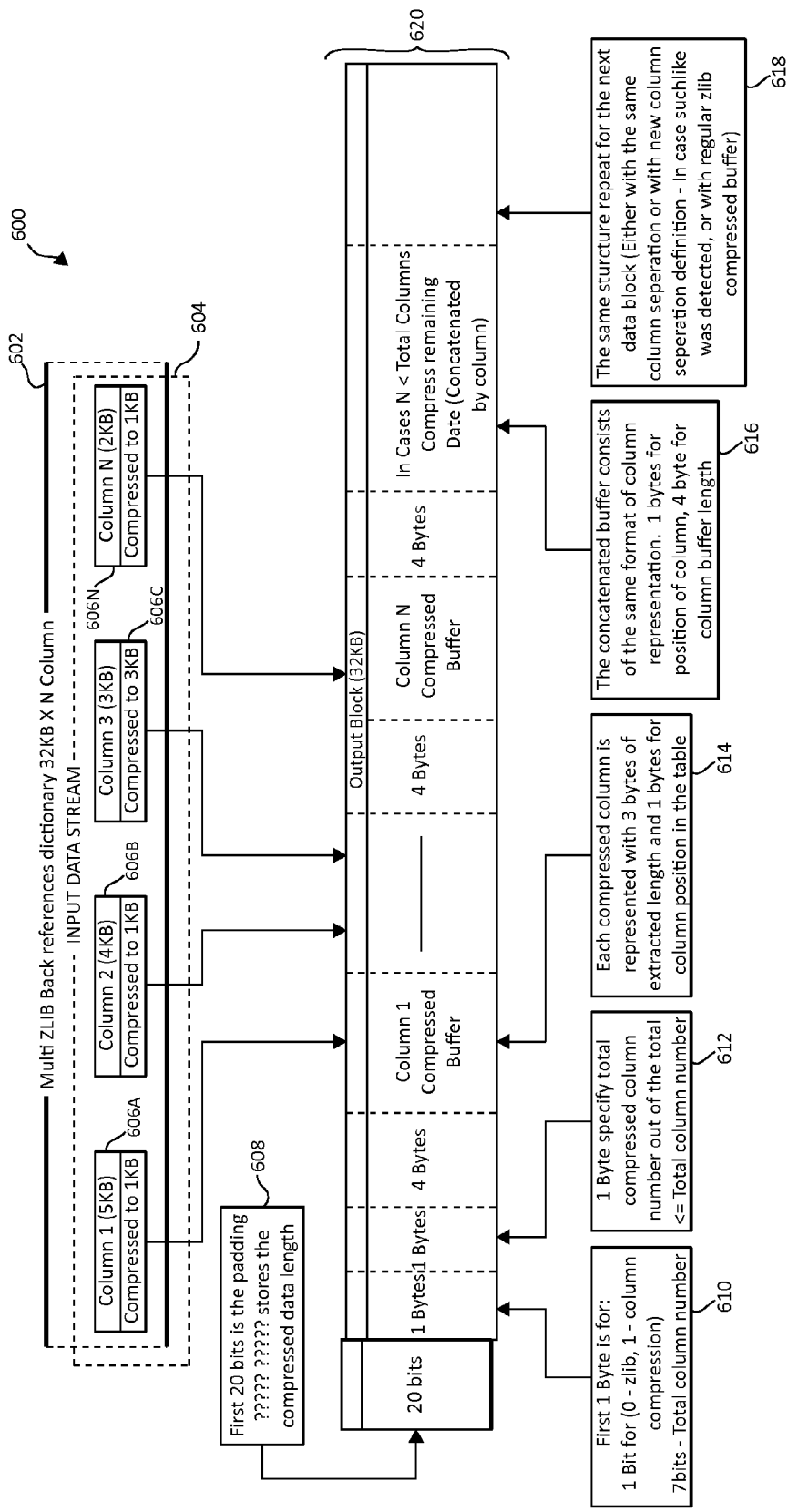
FIG. 6 illustrates an exemplary block diagram showing a multiplex classification for tabular data compression buffer in which aspects of the present invention may be realized.

FIG. 6 illustrates an exemplary block diagram showing a multiplex classification for tabular data compression buffer in which aspects of the present invention may be realized. In FIG. 6, a multi Zlib back-references dictionary with 32 kilobytes (KB)×N column 602 is depicted. Within the input data streams 604, are classified columns 606 of data (illustrated in FIG. 6 as 606A-606N with each column compressed to 1 KB. Each one of the classified columns 606 is placed into the output block 620, which is illustrated to be 32 KB. Within the output block, the following block order may occur. The first 20 bits in output buffer are the padding header 608. The next 1 bytes 610 indicates a 0 for compression (e.g., Zlib compression) or a 1 for column compression. 7 bites represent the total column number 610. Next, the next 1 byte 612 specifies if the total compressed column number out of the total is less than and/or equal to the total column number 612. The column 1 compressed buffer 614 shows that each compressed column is represented with 3 bytes of extracted length and 1 bytes for column position in the table, and repeats up to column N compressed buffer 612. In case N is less than the total columns 616, compress the remaining data (concatenated by column). This concatenated buffer consists of the same format of column representation. 1 bytes are for position of the column and 4 bytes for the column buffer length. Last, the same structure repeats for the next data block 618 (either with the same column separation or with new column separation definition).

Figure 7:
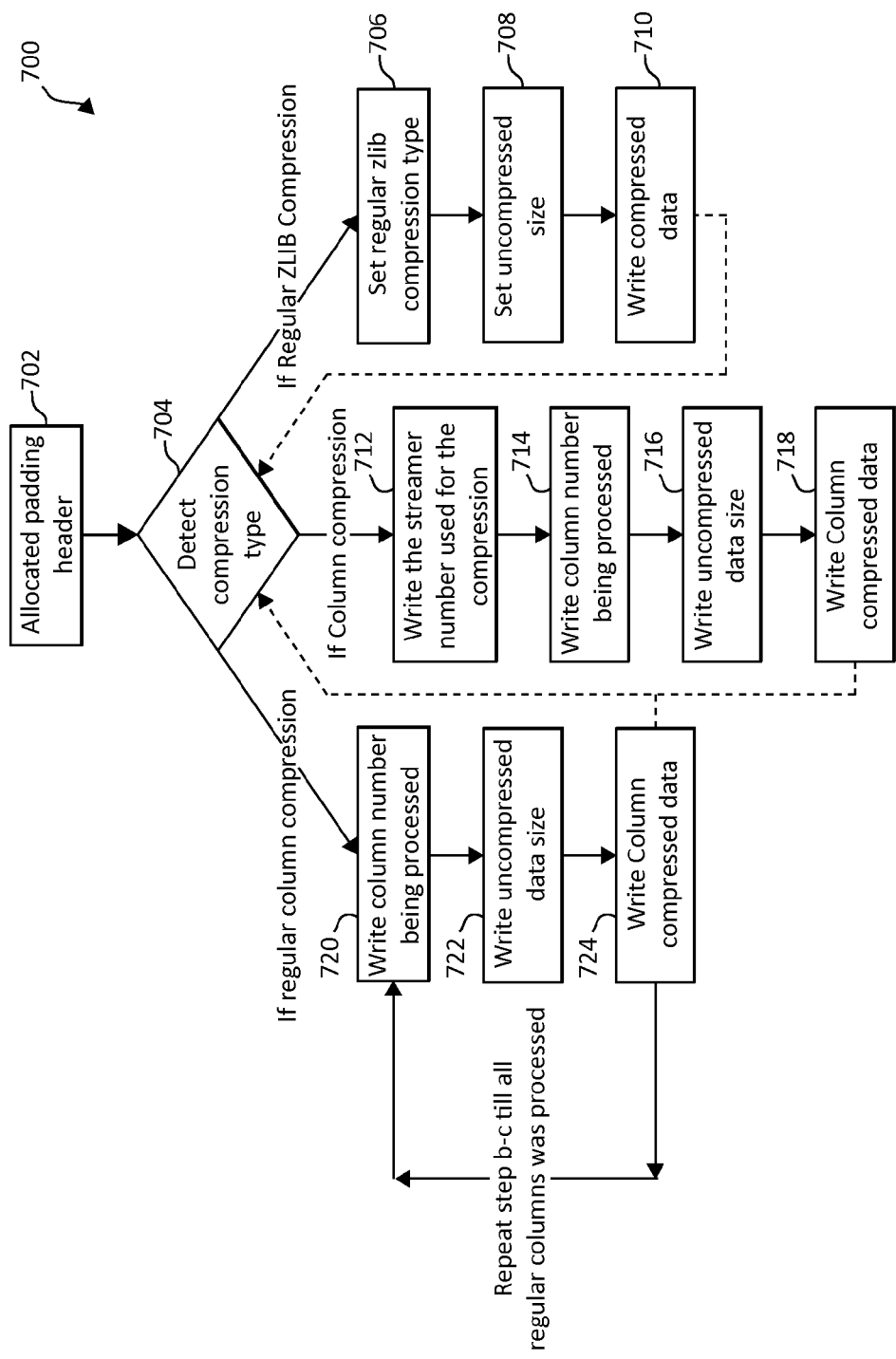
FIG. 7 is a flowchart illustrating an exemplary method for encoding multiplex classification for tabular data compression.

FIG. 7 is a flowchart illustrating an exemplary method 700 for encoding multiplex classification for tabular data compression. The method 700 allocates a padding header (step 702). The method 700 determines the compression type of the compression streams (step 704). If the compression type detected is regular compression, the method 700 may set regular compression type (step 706), set an uncompressed size (step 708), and write compressed data (step 710). However, if the compression type detected is column compression, the method 700 writes a streamer number used for the column compression (step 712). The streamer number is needed for the preceding data processing. The method 700 may then write a column number being processed (step 714), write an uncompressed data size (step 716), and write column compressed data (step 718).

If the compression type detected is regular column compression, the method 700 may write a streamer number used for the regular column compression and write the column number being processed (step 720). The streamer number is needed for the preceding data processing. The method 700 may write the column compressed data size (step 722), and write the column compressed data (step 724). The method 700 repeats steps 720, 722, and 724, e.g., the writing of the streamer number, the column number, and the column compressed data, until all regular column compression streams are processed.

Figure 8:
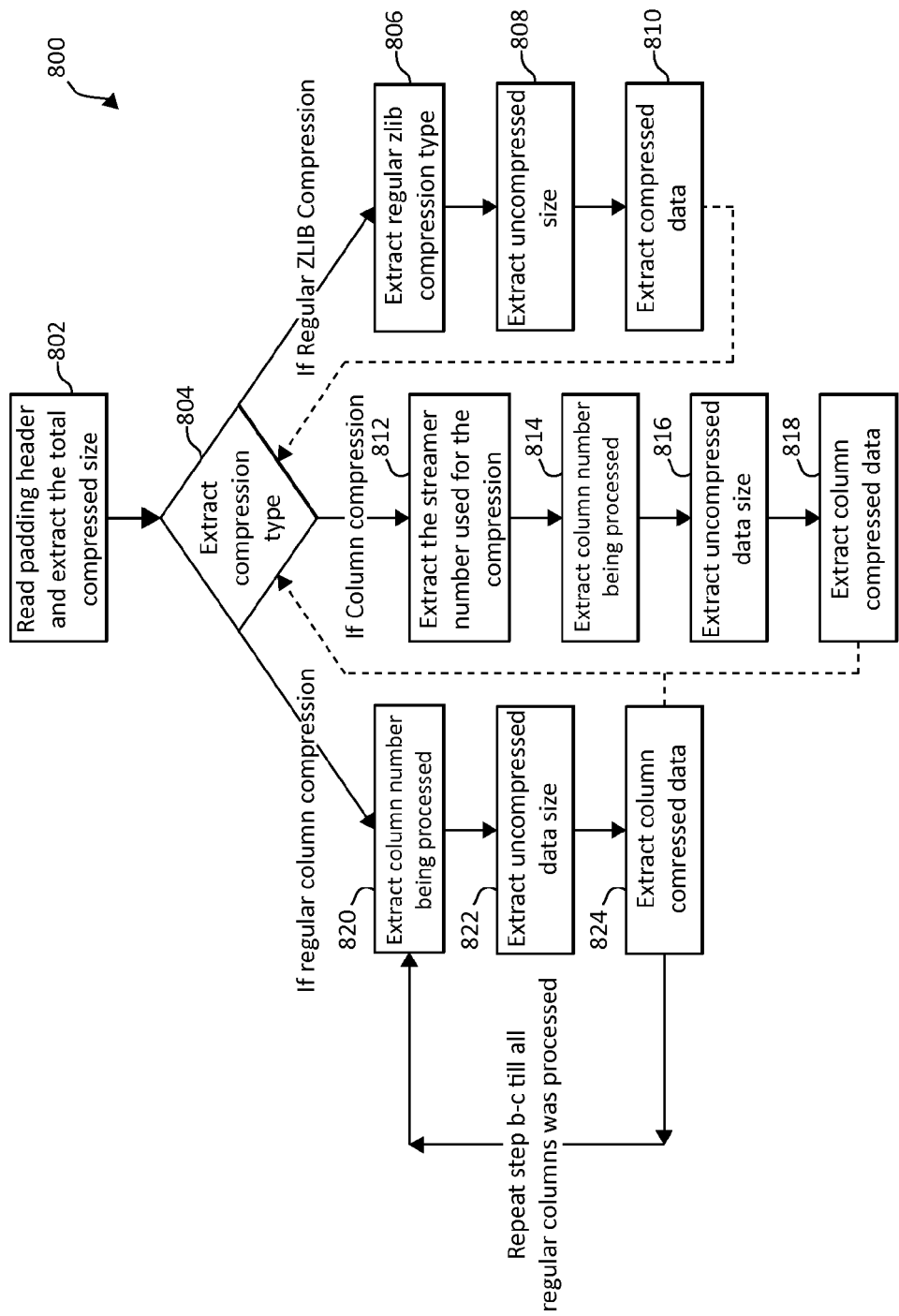
FIG. 8 is a flowchart illustrating an exemplary method for extracting the multiplex classification data back to the original pre-processed input data block.

FIG. 8 is a flowchart illustrating an exemplary method 800 for extracting the multiplex classification data back to the original pre-processed input data block. The method 800 reads the padding header and extracts the total compressed size (step 802). The method 800 determines the extraction compression type of the compression streams (step 804). If the compression type detected is regular compression, the method 800 may extract regular compression type (step 806), extract an uncompressed size (step 808), and extract compressed data (step 810). However, if the compression type detected is column compression, the method 800 extracts a streamer number used for the column compression (step 812). The streamer number is needed for the preceding data processing. The method 800 may then extract a column number being processed (step 814), extract an uncompressed data size (step 816), and extract column compressed data (step 818). It should be noted that the regular compression may include regular Zlib compression.

If the compression type detected is regular column compression, the method 800 may extract a streamer number used for the regular column compression and extract the column number being processed (step 820). The streamer number is needed for the preceding data processing. The method 800 may extract uncompressed data size (step 822), and extract the column compressed data (step 824). The method 800 repeats steps 820, 822, and 824, e.g., the extracting of the streamer number, the column number, and the column compressed data, until all regular column compression streams are extracted.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A system for multiplexer classification for column compression of tabular data in a computing environment, comprising:
at least one processor device, operable in the computing environment, wherein the at least one processor device:
classifies during a single pass of similar type data segments from incoming input data streams, without testing, into one of a plurality of classes for grouping the data segments into compression streams associated with each one of the plurality of classes,
encodes the compression streams based on a class-specific optimized encoding operation, wherein in conjunction with encoding the compression streams performing each one of
allocating a padding header,
detecting a compression type of the compression streams,
if the compression type detected is a regular Zlib compression,
setting regular Zlib compression,
setting an uncompressed size,
writing compressed data, and
if the compression type detected is a column compression,
writing a streamer number used for the column compression,
writing a column number being processed,
writing an uncompressed data size,
writing column compressed data, and
if the compression type detected is a regular column compression,
writing a streamer number used for the regular column compression,
writing a column number being processed,
writing an uncompressed data size, writing column compressed data, and
repeating writing of the streamer number, the column number, and the column compressed data until all regular column compression streams are processed, and
combines the compression streams into one output buffer, wherein the compression streams are extracted.

2. The system of claim 1, wherein the plurality of classes include at least a classification of text, numbers, dates, binary, XML/HTML tags, and email address classes.

3. The system of claim 2, wherein the one output buffer contains at least three types of encoded compression streams, wherein at least three types of encoded compression streams includes a column compression, regular column compression, and regular Zlib compression.

4. The system of claim 1, wherein the at least one processor device, in conjunction with extracting the compression streams, performs at least one of:
reading a padding header and extracting a total compressed size,
extracting a compression type,
if the compression type is a regular Zlib compression,
reading an uncompressed size, and
extracting compressed data,
if the compression type is a column compression,
extracting a streamer number used for the column compression, and
extracting a column number being processed,
extracting an uncompressed data size, and
extracting column compressed data,
if the compression type is a regular column compression,
extracting a streamer number used for the regular column compression,
extracting a column number being processed,
extracting uncompressed data size,
extracting column compressed data, and
extracting the streamer number, the column number, and the column compressed data until all regular column compression streams are extracted.

5. The system of claim 1, wherein the classifying uses a plurality of small dictionaries to assist with short token compression.

6. The system of claim 1, wherein the classifying retains a larger compression window allowing for identification of repetitions.

7. The system of claim 1, wherein the at least one processor device applies at least one of a plurality of columnar compression operations to each of the compression streams for generating an increased compression ratio.

8. A computer program product multiplexer classification for column compression of tabular data by a processor device, the computer program product comprising a non-transitory computer-readable storage medium having computer-readable program code portions stored therein, the computer-readable program code portions comprising:
a first executable portion that classifies during a single pass of similar type data segments from incoming input data streams, without testing, into one of a plurality of classes for grouping the data segments into compression streams associated with each one of the plurality of classes,
a second executable portion that encodes that encodes the compression streams based on a class-specific optimized encoding operation, wherein in conjunction with encoding the compression streams performing each one of:
allocating a padding header,
detecting a compression type of the compression streams,
if the compression type detected is a regular Zlib compression,
setting regular Zlib compression,
setting an uncompressed size,
writing compressed data, and
if the compression type detected is a column compression,
writing a streamer number used for the column compression,
writing a column number being processed,
writing an uncompressed data size,
writing column compressed data, and
if the compression type detected is a regular column compression,
writing a streamer number used for the regular column compression,
writing a column number being processed,
writing an uncompressed data size,
writing column compressed data, and
repeating writing of the streamer number, the column number, and the column compressed data until all regular column compression streams are processed; and
a third executable portion for combining the compression streams into one output buffer, wherein the compression streams are extracted.

9. The computer program product of claim 8, wherein the plurality of classes include at least a classification of text, numbers, dates, binary, XML/HTML tags, and email address classes.

10. The computer program product of claim 9, wherein the one output buffer contains at least three types of encoded compression streams, wherein at least three types of encoded compression streams includes a column compression, regular column compression, and regular Zlib compression.

11. The computer program product of claim 8, further including a fourth executable portion that, in conjunction with extracting the compression streams, performs at least one of:
reading a padding header and extracting a total compressed size,
extracting a compression type,
if the compression type is a regular Zlib compression,
reading an uncompressed size, and
extracting compressed data,
if the compression type is a column compression,
extracting a streamer number used for the column compression, and
extracting a column number being processed,
extracting an uncompressed data size, and
extracting column compressed data,
if the compression type is a regular column compression,
extracting a streamer number used for the regular column compression,
extracting a column number being processed,
extracting uncompressed data size,
extracting column compressed data, and
extracting the streamer number, the column number, and the column compressed data until all regular column compression streams are extracted.

12. The computer program product of claim 8, wherein the classifying uses a plurality of small dictionaries to assist with short token compression.

13. The computer program product of claim 8, wherein the classifying retains a larger compression window allowing for identification of repetitions.

14. The computer program product of claim 8, further including a fourth executable portion that applies at least one of a plurality of columnar compression operations to each of the compression streams for generating an increased compression ratio.

\* \* \* \* \*